(12) United States Patent
Bechmann et al.

(10) Patent No.: US 10,987,867 B2
(45) Date of Patent: Apr. 27, 2021

(54) APPARATUS FOR ADDITIVE MANUFACTURING OF THREE-DIMENSIONAL OBJECTS

(71) Applicant: CL SCHUTZRECHTSVERWALTUNGS GMBH, Lichtenfels (DE)

(72) Inventors: Florian Bechmann, Lichtenfels (DE); Tobias Dressel, Wilhelmsthal (DE); Viktor Engel, Coburg (DE); Christian Diller, Lichtenfels (DE)

(73) Assignee: Concept Laser GMBH, Lichtenfels (DE)

( * ) Notice: Subject to any disclaimer, the term of this patent is extended or adjusted under 35 U.S.C. 154(b) by 352 days.

(21) Appl. No.: 15/811,452

(22) Filed: Nov. 13, 2017

(65) Prior Publication Data

US 2018/0133967 A1    May 17, 2018

(30) Foreign Application Priority Data

Nov. 14, 2016 (DE) .......................... 102016121770.0

(51) Int. Cl.
*B29C 64/371* (2017.01)
*B29C 64/153* (2017.01)
(Continued)

(52) U.S. Cl.
CPC .......... *B29C 64/371* (2017.08); *B29C 64/153* (2017.08); *B33Y 10/00* (2014.12);
(Continued)

(58) Field of Classification Search
CPC ..... B29C 64/371; B29C 64/153; B33Y 30/00; B33Y 10/00; B33Y 40/00; B22F 2201/11; B22F 2003/1056; B22F 3/1055
See application file for complete search history.

(56) References Cited

U.S. PATENT DOCUMENTS

| 6,583,379 B1 | 6/2003 | Meiners et al. |
| 2011/0291331 A1 | 12/2011 | Scott |

(Continued)

FOREIGN PATENT DOCUMENTS

| CN | 102164696 A | 8/2011 |
| DE | 19853947 C1 | 2/2000 |

(Continued)

OTHER PUBLICATIONS

European Search Report Corresponding to Application No. 17185010 dated Feb. 21, 2018.

(Continued)

*Primary Examiner* — Nahida Sultana
(74) *Attorney, Agent, or Firm* — Dority & Manning, P.A.

(57) ABSTRACT

An apparatus (1) for additive manufacturing of three-dimensional objects (2) by successive, selective layer-by-layer exposure and thus successive, selective layer-by-layer solidification of construction material layers of construction material (3) that can be solidified by means of an energy beam in a process chamber (7) of the apparatus with a defined process chamber height (H), comprising a flow device (8) provided for generating an, especially inert, gas flow (11) flowing through the process chamber (7) between an inflow section (9) and an outflow section (10), wherein the gas flow (11) flows through the process chamber (7) across the entire process chamber height (H), wherein the gas flow (11) is subdivided into several partial gas flows (11a-11c) flowing through the process chamber (7) parallel on top of each other, which differ in at least one flow parameter affecting the flow characteristics of the respective partial gas flows (11a-11c).

17 Claims, 4 Drawing Sheets

Figure 1:
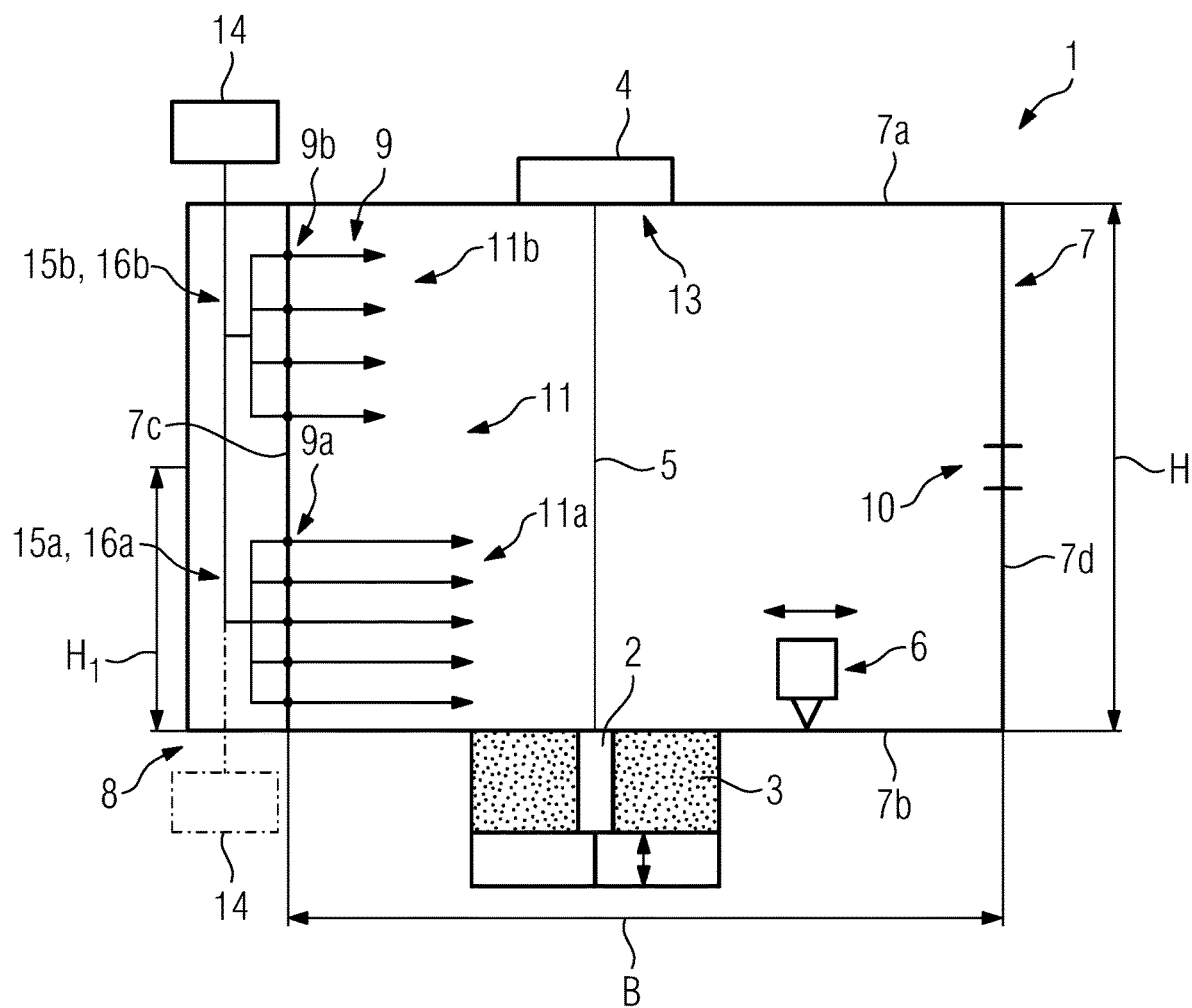

(51) Int. Cl.
  *B33Y 30/00* (2015.01)
  *B33Y 10/00* (2015.01)
  *B33Y 40/00* (2020.01)
  *B22F 3/105* (2006.01)

(52) U.S. Cl.
  CPC .............. *B33Y 30/00* (2014.12); *B33Y 40/00* (2014.12); *B22F 2003/1056* (2013.01); *B22F 2201/11* (2013.01)

(56) References Cited

U.S. PATENT DOCUMENTS

| | | | |
|---|---|---|---|
| 2014/0271965 A1* | 9/2014 | Ferrar | B22F 3/1055 425/163 |
| 2016/0114531 A1* | 4/2016 | Chuang | B33Y 10/00 264/497 |
| 2016/0121398 A1 | 5/2016 | Schlick et al. | |
| 2016/0214173 A1* | 7/2016 | Fisser | B22F 3/1007 |
| 2017/0120330 A1* | 5/2017 | Sutcliffe | B29C 64/268 |
| 2017/0146382 A1* | 5/2017 | Gold | G01F 15/14 |
| 2019/0099956 A1* | 4/2019 | Wuest | B29C 64/268 |
| 2019/0270250 A1* | 9/2019 | Sartori | B29C 64/295 |
| 2019/0285455 A1* | 9/2019 | Gold | G01F 15/14 |
| 2019/0308370 A1* | 10/2019 | Lyckfeldt | B33Y 70/00 |
| 2019/0374983 A1* | 12/2019 | Barua | B08B 5/02 |
| 2020/0061655 A1* | 2/2020 | Wakelam | B05B 12/006 |
| 2020/0156319 A1* | 5/2020 | Dohler | B29C 64/25 |
| 2020/0368963 A1* | 11/2020 | Shimoda | B29C 64/371 |

FOREIGN PATENT DOCUMENTS

| | | |
|---|---|---|
| DE | 102006014835 A1 | 10/2007 |
| DE | 102014000022 A1 | 7/2015 |
| EP | 3015197 A1 | 5/2016 |
| JP | 2017/523303 A | 8/2017 |
| WO | 2014199150 A1 | 12/2014 |
| WO | 2015189619 A1 | 12/2015 |

OTHER PUBLICATIONS

Machine Translated Japanese Search Report Corresponding to Application No. 2017217172 dated Oct. 15, 2018.
Machine Translated Japanese Office Action Corresponding to Application No. 20172171172 dated Nov. 14, 2018.
German Search Report Corresponding to Application No. 102016121770 dated Dec. 10, 2018.
Machine Translated Chinese Office Action Corresponding to Application No, 201710969747 dated Jun. 24, 2019.
Machine Translated Japanese Office Action Corresponding to Application No. 2017217172 dated Aug. 14, 2019.

* cited by examiner

APPARATUS FOR ADDITIVE MANUFACTURING OF THREE-DIMENSIONAL OBJECTS

CROSS-REFERENCE TO RELATED APPLICATIONS

This application claims priority to German Patent Application serial no. 10 2016 121 770.0 filed Nov. 14, 2016, the contents of which is incorporated herein by reference in its entirety as if set forth verbatim.

DESCRIPTION

The invention relates to an apparatus for additive manufacturing of three-dimensional objects by successive, selective layer-by-layer exposure and thus successive, selective layer-by-layer solidification of construction material layers of construction material that can be solidified by means of an energy beam in a process chamber of the apparatus with a defined process chamber height, comprising a flow device provided for generating an, especially inert, gas flow flowing through the process chamber between an inflow section and an outflow section.

Such apparatuses are actually known for additive manufacturing of three-dimensional objects. By means of respective apparatuses, three-dimensional objects to be manufactured are constructed additively from construction material that can be solidified by means of an energy beam by successive, selective layer-by-layer exposure and thus successive, selective layer-by-layer solidification of construction material layers in the areas corresponding to the layer-related cross-section of the object to be manufactured.

To remove particulate impurities forming related to the process, i.e., especially smoke and/or smolder particles, from the process chamber, it is known to provide a flow device for generating an, especially inert, gas flow flowing through the process chamber between an inflow section of the process chamber and an outflow section of the process chamber.

There is a consistent need for development of respective flow devices with regard to the efficiency of the removal of particulate impurities forming related to the process from the process chamber.

The invention is based on the object to provide, especially with regard to the efficiency of the removal of particulate impurities forming related to the process from the process chamber, an improved apparatus for additive manufacturing of three-dimensional objects.

The apparatus described herein ("apparatus") is provided for additive manufacturing of three-dimensional objects, i.e., for example, technical components or technical component groups, by successive, selective layer-by-layer exposure and thus successive, selective layer-by-layer solidification of construction material layers of construction material that can be solidified in the areas corresponding to the layer-related cross-section of the object to be manufactured. The construction material can especially be particulate or powdered metal, plastic, and/or ceramic material. The selective solidification of respective construction material layers to be solidified selectively is performed based on object-related construction data. Respective construction data describe the geometric structural design of the respective object to be manufactured additively and can, for example, include "sliced" CAD data of the object to be manufactured additively. The apparatus can be formed as an SLM apparatus, i.e. as an apparatus for performing selective laser melting methods (SLM methods), or as an SLS apparatus, i.e. as an apparatus for performing selective laser sintering methods (SLS methods).

The apparatus comprises the functional components typically required to perform additive construction processes, including especially a coating device provided for forming construction material layers to be solidified selectively (in the construction plane of the apparatus) and an exposure device provided for selectively exposing construction material layers to be solidified selectively (in the construction plane of the apparatus). The coating device can comprise several components, i.e., for example, a coating element comprising an, especially blade-shaped, coating tool and a guiding device for guiding the coating element along a defined movement path. The exposure device, too, can comprise several components, i.e., for example, a beam generation device for generating an energy or laser beam, a beam deflection device (scanner device) for deflecting an energy or laser beam generated by the beam generation device onto an area to be exposed of a construction material layer to be solidified selectively, and diverse optical elements such as filter elements, objective elements, lens elements, etc.

The apparatus comprises a process chamber which can be rendered inert. The process chamber is limited spatially and physically by process chamber limitations. The process chamber has a process chamber height defined by an upper and a lower process chamber limitation. An upper process chamber limitation can be a process chamber wall limiting the process chamber at the top. A lower process chamber limitation can be a process chamber wall limiting the process chamber at the bottom. A lower process chamber limitation can also be a surface or upper side of a powder module assembly comprising at least one powder module, especially a construction module, in the powder receiving room (construction room) of which the actual additive manufacturing of three-dimensional objects takes place. A respective powder module assembly can be dockable via (mechanic) docking interfaces on the powder module assembly to a docking area comprising (mechanic) docking interfaces on the process chamber to a process chamber wall, especially to a process chamber wall limiting the process chamber at the side.

The apparatus comprises a flow device provided for generating an, especially inert, gas flow, i.e., for example, an argon or nitrogen flow, flowing through the process chamber between an inflow section of the process chamber and an outflow section of the process chamber. The inflow section of the process chamber and the outflow section of the process chamber are typically arranged or formed opposingly, especially in process chamber limitations or walls limiting the process chamber at the side. The gas flow flows through the process chamber especially across its entire width or length.

In any case, the gas flow flows through the process chamber across the entire process chamber height. The flow device is therefore provided for generating a gas flow that flows through the process chamber across the entire process chamber height. Regarding the height direction, there is thus no process chamber area that is not flown through by the gas flow. Thus, the inflow section typically extends across the entire process chamber height, too; this is not mandatory, however, as it can also be achieved with a suitable alignment of the gas flow or a part of the gas flow that the gas flow flows through the process chamber across the entire process chamber height.

Moreover, the gas flow is subdivided into several partial gas flows flowing through the process chamber parallel on top of each other. The respective partial gas flows differ in at least one flow parameter affecting the flow characteristics of the respective partial gas flows. The flow parameter is especially the flow rate. Therefore, the flow device is provided for subdividing the gas flow into several single or partial gas flows flowing through the process chamber parallel on top of each other, differing in at least one flow parameter affecting the flow characteristics of the respective partial gas flows. The respective partial gas flows flowing through the process chamber parallel on top of each together form the gas flow flowing through the process chamber; the gas flow thus comprises different flow sections formed by the different partial gas flows lying parallel on top of each other in which the gas flow flows through the process chamber with different flow characteristics.

Therefore, the flow device typically comprises a first inflow element or a group of first inflow elements, which is provided for flowing gas into the process chamber by or for forming a first partial gas flow, and at least one further inflow element or at least one group of further inflow elements, which is provided for flowing gas into the process chamber by or for forming the at least one further partial gas flow. A respective inflow element comprises at least one, especially nozzle-like or nozzle-shaped, inflow opening. A respective inflow element can at least sectionally have a structure that influences the flow, i.e., for example, a lattice or honeycomb structure, which is formed by a lattice- or honeycomb-like or -shaped arrangement and/or formation of respective inflow openings.

At this point, it is to be noted that the outflow section comprises at least one outflow element for flowing the process gas flow out of the process chamber. A respective outflow element comprises at least one, possibly nozzle-like or nozzle-shaped, outflow opening.

Due to the fact that the gas flow flows through the process chamber across the entire process chamber height and several partial gas flows with different flow characteristics, i.e. especially different flow rates, are used, the efficiency of the removal of respective particulate impurities from the process chamber is increased. Due to the fact that the gas flow flows through the process chamber across the entire process chamber height and several partial gas flows with different flow characteristics, i.e. especially different flow rates, are used, undesired turbulences are also avoided. All in all, especially with regard to the efficiency of the removal of particulate impurities forming related to the process from the process chamber, an improved apparatus for additive manufacturing of three-dimensional objects is provided.

The flow device can especially be provided for generating a first partial gas flow (lower partial gas flow), which flows through the process chamber in a first flow area between a lower process chamber limitation, especially a process chamber wall limiting the process chamber at the bottom, and a first height section of the process chamber along the lower process chamber limitation, especially along the process chamber wall limiting the process chamber at the bottom, and another (or second) partial gas flow (upper partial gas flow), which flows in another flow area between the first height section of the process chamber and an upper process chamber limitation, especially a process chamber wall limiting the process chamber at the top, along the upper process chamber limitation, especially along the process chamber wall limiting the process chamber at the top. The flow device can therefore be provided for subdividing the gas flow into two respective partial gas flows.

Hence, the gas flow can be subdivided into (exactly) two partial gas flows, wherein a first partial gas flow flows through the process chamber in a first flow area between the lower process chamber limitation and a first height section of the process chamber along the lower process chamber limitation, and another partial gas flow flows through the process chamber in another flow area between the first height section of the process chamber and the upper process chamber limitation along the upper process chamber limitation.

However, it is also conceivable that the flow device is provided for generating a first partial gas flow (lower partial gas flow), which flows through the process chamber in a first flow area between a lower process chamber limitation, especially a process chamber wall limiting the process chamber at the bottom, and a first height section of the process chamber along the lower process chamber limitation, especially along the process chamber wall limiting the process chamber at the bottom, a second partial gas flow (middle partial gas flow), which flows through the process chamber in a second flow area between the first height section of the process chamber and a second height section of the process chamber, and a third partial gas flow (upper partial gas flow), which flows through the process chamber in a third flow area between the second height section of the process chamber and an upper process chamber limitation, especially a process chamber wall limiting the process chamber at the top, along the upper process chamber limitation, especially along the process chamber wall limiting the process chamber at the top. The flow device can therefore be provided for subdividing the gas flow into (exactly) three partial gas flows.

Hence, the gas flow can be subdivided into three partial gas flows, wherein a first partial gas flow flows through the process chamber in a first flow area between a lower process chamber limitation and a first height section of the process chamber along the lower process chamber limitation, a second partial gas flow flows through the process chamber in a second flow area between the first height section of the process chamber and a second height section of the process chamber, and a third partial gas flow flows through the process chamber in a third flow area between the second height section of the process chamber and an upper process chamber limitation along the upper process chamber limitation.

Of course, it is also possible to subdivide the gas flow into more than three partial gas flows. The preceding explanations apply analogously.

In all cases, the first partial gas flow flows directly above a construction plane of the apparatus in which the successive, selective layer-by-layer exposure and thus the successive, selective layer-by-layer solidification of construction material layers of construction material that can be solidified by means of an energy beam takes place. Thus, the first partial gas flow removes especially impurities forming related to the process from the construction plane area.

Another partial gas flow, i.e., in the case of two partial gas flows the second partial gas flow and in the case of three partial gas flows the third partial gas flow, flows directly along a process chamber limitation or wall limiting the process chamber at the top. Here, the further partial gas flow typically flows directly below an energy beam coupling device, e.g. in the form of an energy beam coupling window, which is provided for coupling an energy or laser beam into the process chamber. Thus, the further partial gas flow removes especially impurities forming related to the process from the energy beam coupling device area.

The first partial gas flow can have a higher flow rate than at least the further partial gas flow flowing directly above it. Thus, efficient removal of impurities forming related to the process from the construction plane area is ensured.

The third partial gas flow, if any, can have a higher flow rate than at least the second partial gas flow flowing directly below it. Thus, efficient removal of impurities forming related to the process from the energy beam coupling device area is ensured. Hence, in the case of three partial gas flows, a flow rate distribution of the gas flow can result with a comparably high flow rate in the range of a lower process chamber limitation, especially in the construction plane area, and in the range of an upper process chamber limitation, especially in the energy beam coupling device area, and a comparably less high flow rate in an area lying in between. Due to the purposeful flow rate increase in the lower and upper flow areas, the negative influence of respective impurities forming related to the process particularly relevant to the component or process quality there can be reduced; any negative influence of the flow rate on the energy or laser beam penetrating the process chamber can be prevented with a comparably low flow rate in the middle flow area lying in between.

The flow device can comprise at least two different flow generation devices, especially suction or blower devices, for generating the partial gas flows differing in at least one flow parameter affecting the flow characteristics of the respective partial gas flows. A first flow generation device can be provided for generating a first partial gas flow and at least one further flow generation device can be provided for generating at least one further partial gas flow. The first flow generation device is assigned to a first inflow element or a group of first inflow elements; the further flow generation device is assigned to a further inflow element or a group of further inflow elements. The respective flow generation devices can differ, e.g., in their power consumptions so that they can generate partial gas flows with different flow characteristics.

The flow device can (also) comprise at least two different inflow elements or at least two groups of different inflow elements for generating the partial gas flows differing in at least one flow parameter affecting the flow characteristics of the respective partial gas flows. A first inflow element or a group of first inflow elements can be provided for generating a first partial gas flow, and at least one further inflow element or at least one group of further inflow elements can be provided for generating at least one further partial gas flow. The respective inflow elements can differ, e.g., in the geometry of their respective inflow openings influencing the flow characteristics.

The flow device can (also) comprise at least two different flow guidance element assemblies, each comprising at least one flow guidance element, e.g. in the form of a flow deflector plate, for generating the partial gas flows differing in at least one flow parameter affecting the flow characteristics of the respective partial gas flows. A first flow guidance element assembly can be provided for generating a first partial gas flow, and a further flow guidance element assembly can be provided for generating a further partial gas flow. The respective flow guidance element assemblies can differ, e.g. in the geometry of their respective flow guidance elements influencing the flow characteristics. The respective flow guidance element assemblies are typically connected upstream of the inflow elements regarding fluid engineering.

As mentioned, the flow device typically comprises a first inflow element or a group of first inflow elements, which is provided for flowing gas into the process chamber by or for forming a first partial gas flow, and at least one further inflow element or at least one group of further inflow elements, which is provided for flowing gas into the process chamber by or for forming the at least one further partial gas flow.

The first inflow element or the group of first inflow elements provided for generating the first partial gas flow can be movably supported, especially relative to the construction plane in which the successive, selective layer-by-layer exposure and thus the successive, selective layer-by-layer solidification of construction material layers of construction material that can be solidified by means of an energy beam takes place. It is thus possible to move the first partial gas flow close to a selectively exposed or solidified area of a construction material layer, which increases the efficiency of the removal of impurities forming related to the process.

The first inflow element or the group of first inflow elements can therefore be arranged or formed on or in a functional component of the apparatus movably supported inside the process chamber, especially relative to the construction plane in which the successive, selective layer-by-layer exposure and thus the successive, selective layer-by-layer solidification of construction material layers of construction material that can be solidified by means of an energy beam takes place. Concretely, the first inflow element or the group of first inflow elements can be arranged or formed on or in a functional component of a coating device, especially a coater base body carrying an, especially blade-like or blade-shaped, coating element, provided for forming construction material layers to be solidified selectively in the construction plane of the apparatus, movably supported inside the process chamber, especially relative to the construction plane in which the successive, selective layer-by-layer exposure and thus the successive, selective layer-by-layer solidification of construction material layers of construction material that can be solidified by means of an energy beam takes place.

The outflow section can be arranged or formed especially in the center of an, especially tapered, process chamber wall limiting the process chamber at the side. Due to the given geometry, especially the given conicity, respective partial gas flows can flow together out of the process chamber in the range of the outflow section, which allows, especially because of a thus realized suction effect, efficient escape of gas flow enriched with impurities forming related to the process from the process chamber.

The invention is explained in more detail by means of exemplary embodiments in the figures of the drawings. In which:

FIGS. 1-4 each show a schematic diagram of an apparatus according to an exemplary embodiment.

FIG. 1 shows a schematic diagram of an apparatus 1 according to an exemplary embodiment. FIG. 1 as well as the other figures only show the section of the apparatus 1 relevant to explaining the principle described in the following.

The apparatus 1 serves for additive manufacturing of three-dimensional objects 2, i.e. especially technical components or technical component groups, by successive, selective layer-by-layer exposure and thus successive, selective layer-by-layer solidification of construction material layers of a construction material 3 that can be solidified, i.e., for example, metal powder, by means of a laser beam 5 generated by an exposure device 4, which typically comprises a laser beam generation device (not shown) and a laser beam deflection or scanner device (not shown). The selective solidification of respective construction material layers to be solidified is performed based on object-related construction data. Respective construction data describe the geometric or geometric-structural design of the respective object 2 to be additively manufactured and can, for example, include "sliced" CAD data of the object 2 to be manufactured. The apparatus 1 can be formed as a Laser-CUSING® apparatus, i.e. as an apparatus for performing selective laser melting methods.

The apparatus 1 comprises the functional components required to perform additive construction processes, including especially a coating device 6 provided for forming construction material layers to be solidified selectively in the construction plane E of the apparatus 1 and the already mentioned exposure device 4 provided for selectively exposing construction material layers to be solidified selectively in the construction plane E of the apparatus 1.

The mentioned functional components are arranged or formed on or in a process chamber 7 of the apparatus 1, which can be rendered inert. The process chamber 7 is limited spatially and physically by process chamber limitations and has a process chamber height H defined by an upper and a lower process chamber limitation. In the exemplary embodiment according to FIG. 1, the upper process chamber limitation is a process chamber wall 7a limiting the process chamber 7 at the top; the lower process chamber limitation is a process chamber wall 7b limiting the process chamber 7 at the bottom.

The apparatus 1 furthermore comprises a flow device 8 provided for generating an inert gas flow 11 flowing through the process chamber 7 between an inflow section 9 of the process chamber and an outflow section 10 of the process chamber. The inflow section 9 and the outflow section 10 are arranged or formed opposingly in the process chamber walls 7c, 7d limiting the process chamber 7 at the side. The gas flow 11 flows through the process chamber 7 across its entire width B.

Apparently, the gas flow 11 flows through the process chamber 7 across the entire process chamber height H, too. Therefore, the flow device 8 is provided for generating a gas flow 11 that flows through the process chamber 7 across the entire process chamber height H. Regarding the height direction, there is thus no process chamber area that is not flown through by the gas flow 11. Thus, the inflow section 9 typically extends, as shown in FIG. 1, across the process chamber height H, too.

The flow device 8 is provided for subdividing the gas flow 11 into several partial gas flows 11a, 11b flowing through the process chamber 7 parallel on top of each other, which differ in at least one flow parameter, i.e. in the exemplary embodiments shown in the figures exemplarily the flow rate, affecting the flow characteristics of the respective partial gas flows 11a, 11b. The respective partial gas flows 11a, 11b flowing through the process chamber 7 parallel on top of each other together form the gas flow 11 flowing through the process chamber 7; the gas flow 11 thus comprises different flow sections formed by the different partial gas flows 11a, 11b lying parallel on top of each other in which the gas flow 11 flows through the process chamber 7 with different flow characteristics. The different flow rates of the partial gas flows 11a, 11b are indicated by the arrows of different lengths.

The flow device 8 comprises a group of first inflow elements 9a, which are provided for flowing gas into the process chamber 7 by or for forming a first partial gas flow 11a, and a group of further inflow elements 9b, which is provided for flowing gas into the process chamber 7 by or for forming a second partial gas flow 11b. A respective inflow element 9a, 9b comprises at least one, especially nozzle-like or nozzle-shaped, inflow opening (not shown). A respective inflow element 9a, 9b can at least sectionally have a structure that influences the flow, i.e., for example, a lattice or honeycomb structure, which is formed by a lattice- or honeycomb-like or -shaped arrangement and/or formation of respective inflow openings.

In the exemplary embodiment according to FIG. 1, the gas flow 11 is subdivided into two partial gas flows 11a, 11b. The first partial gas flow 11a (lower partial gas flow) flows through the process chamber 7 in a first flow area between the lower process chamber wall 7b and a first height section H1 of the process chamber 7 along the lower process chamber wall 7b. The second partial gas flow 11b (upper partial gas flow) flows through the process chamber 7 in a second flow area between the first height section H1 of the process chamber 7 and the upper process chamber wall 7a along the upper process chamber wall 7a.

The flow device 8 is accordingly provided for generating a first partial gas flow 11a, which flows through the process chamber 7 in a first flow area between a process chamber wall 7b limiting the process chamber 7 at the bottom and a first height section H1 of the process chamber 7 along the process chamber wall 7b limiting the process chamber 7 at the bottom, and a second partial gas flow 11b, which flows through the process chamber 7 in a second flow area between the first height section H1 of the process chamber 7 and the process chamber wall 7a limiting the process chamber 7 at the top along the process chamber wall 7a limiting the process chamber 7 at the top. The flow device 8 is therefore provided for subdividing the gas flow 11 into two respective partial gas flows 11a, 11b.

The first partial gas flow 11a flows directly above the construction plane E of the apparatus 1. Thus, the first partial gas flow 11a removes especially impurities forming related to the process from the construction plane E area. The length of the arrows indicates that the first partial gas flow 11a has a higher flow rate than the second partial gas flow 11b flowing directly above it. Thus, efficient removal of impurities forming related to the process from the construction plane E area is ensured.

The second partial gas flow 11b flows directly along the process chamber wall 7a limiting the process chamber 7 at the top. Here, the second partial gas flow 11b flows directly below an energy beam coupling device 13, e.g. in the form of an energy beam coupling window, which is provided for coupling the laser beam 5 into the process chamber 7. Thus, the second partial gas flow 11b removes especially impurities forming related to the process from the energy beam coupling device 13 area.

For generating the partial gas flows 11a, 11b, the flow device 8 comprises two groups of different inflow elements 9a, 9b. A group of first inflow elements 9a is provided for generating the first partial gas flow 11a, and a group of further inflow elements 9b is provided for generating the second partial gas flow 11b. The respective inflow elements 9a, 9b differ in the geometry of their respective inflow openings affecting the flow characteristics, from which the described flow rate profile of the gas flow 11 results.

In FIG. 1, an optional second flow generation device 14 indicates that the flow device 8 for generating the partial gas flows 11a, 11b can (also) comprise two different flow generation devices 14, especially suction or blower devices. A first flow generation device 14 is provided for generating the first partial gas flow 11a, a second flow generation device 14 is provided for generating the second partial gas flow 11b. The first flow generation device 14 is assigned to the group of first inflow elements 9a; the second flow generation device 14 is assigned to the group of second inflow elements 9b. The respective flow generation devices 14 can differ, e.g. in their power consumptions so that they can generate partial gas flows 11a, 11b with different flow characteristics, from which the described flow rate profile of the gas flow 11 results.

For generating the partial gas flows 11a, 11b, the flow device 8 can (also) comprise two different flow guidance element assemblies 16a, 16b, each comprising at least one flow guidance element 15a, 15b, e.g. in the form of a flow deflector plate. The respective flow guidance element assemblies 16a, 16b are connected upstream of the inflow elements 9a, 9b regarding fluid engineering. A first flow guidance element assembly 16a is provided for generating the first partial gas flow 11a, and a second flow guidance element assembly 16 is provided for generating the second partial gas flow 11b. The respective flow guidance element assemblies 16a, 16b can differ, e.g. in the geometry of their respective flow guidance elements 15a, 15b affecting the flow characteristics, from which the described flow rate profile of the gas flow 11 results.

Figure 2:
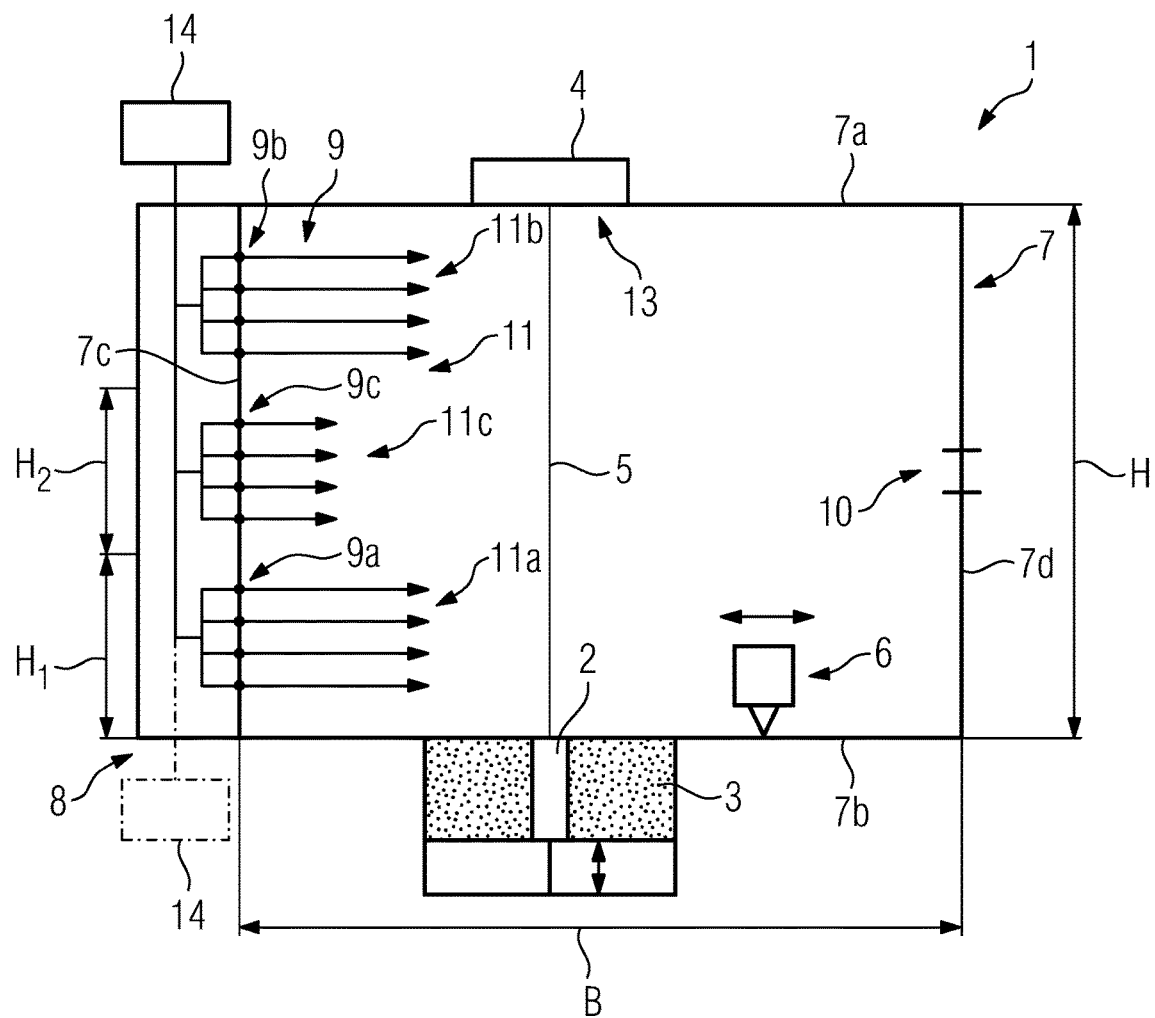

FIG. 2 shows a schematic diagram of an apparatus 1 according to another exemplary embodiment.

From FIG. 2 it can be seen that the gas flow 11 can be subdivided into three partial gas flows 11a-11c, wherein a first partial gas flow 11a flows through the process chamber 7 in a first flow area between a lower process chamber limitation, i.e., the process chamber wall 7b limiting the process chamber 7 at the bottom, and a first height section H1 of the process chamber 7 along the lower process chamber limitation, and a second partial gas flow 11c flows through the process chamber 7 in a second flow area between the first height section H1 of the process chamber 7 and a second height section H2 of the process chamber 7, and a third partial gas flow 11b flows through the process chamber 7 in a third flow area between the second height section H2 of the process chamber 7 and an upper process chamber limitation, i.e. the upper process chamber wall 7a limiting the process chamber 7 at the top, along the upper process chamber limitation.

The flow device 8 is here provided for generating a first partial gas flow 11a (lower partial gas flow), which flows through the process chamber 7 in a first flow area between the process chamber wall 7b limiting the process chamber 7 at the bottom and the first height section H1 of the process chamber 7 along the process chamber wall 7b limiting the process chamber 7 at the bottom, a second partial gas flow 11c (middle partial gas flow), which flows through the process chamber 7 in a second flow area between the first height section H1 of the process chamber 7 and a second height section H2 of the process chamber 7, and a third partial gas flow 11b (upper partial gas flow), which flows through the process chamber 7 in a third flow area between the second height section H2 of the process chamber 7 and the process chamber wall 7a limiting the process chamber 7 at the top along the process chamber wall 7a limiting the process chamber 7 at the top. The flow device 8 is therefore provided for subdividing the gas flow 11 into three partial gas flows 11a-11c.

The lower partial gas flow 11a, in turn, flows directly above the construction plane E of the apparatus 1. Thus, the lower partial gas flow 11a removes especially impurities forming related to the process from the construction plane E area. The length of the arrows indicates that the lower partial gas flow 11a has a higher flow rate than the middle partial gas flow 11c flowing directly above it. Thus, efficient removal of impurities forming related to the process from the construction plane E area is ensured.

The upper partial gas flow 11b, in turn, flows directly along the process chamber wall 7a limiting the process chamber 7 at the top. Here, the upper partial gas flow 11b flows directly below the energy beam coupling device 13. Thus, the upper partial gas flow 11b removes especially impurities forming related to the process from the energy beam coupling device 13 area. The length of the arrows indicates that the upper partial gas flow 11b, too, has a higher flow rate than the middle partial gas flow 11c flowing directly below it. Thus, efficient removal of impurities forming related to the process from the energy beam coupling device 13 area is ensured. Due to the purposeful flow rate increase in the upper and lower flow areas, the negative influence of respective impurities forming related to the process particularly relevant to the component or process quality there can be reduced; any negative influence of the flow rate on the laser beam 5 can be prevented with a comparably low flow rate in the middle flow area lying in between.

Of course, it is also possible to subdivide the gas flow 11 into more than three partial gas flows. The preceding explanations apply analogously.

Figure 3:
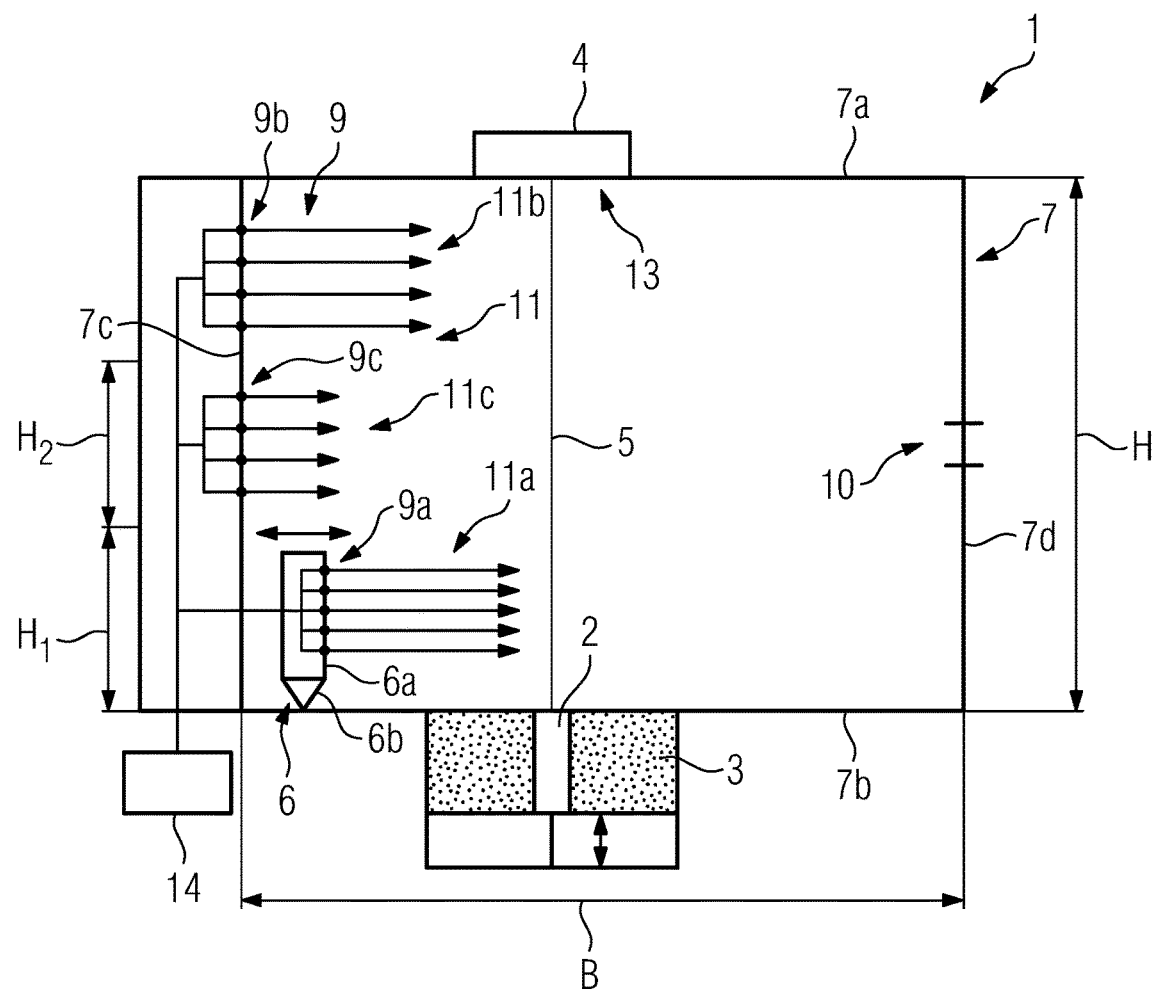

FIG. 3 shows a schematic diagram of an apparatus 1 according to another exemplary embodiment.

From FIG. 3 it can be seen that the group of first inflow elements 9a provided for generating the first partial gas flow 11a can be movably supported relative to the construction plane E. It is thus possible to move the first partial gas flow 11a close to a selectively exposed or solidified area of a construction material layer, which increases the efficiency of the removal of impurities forming related to the process.

The group of first inflow elements 11a is arranged or formed on or in a functional component of the apparatus 1 supported inside the process chamber 7 relative to the construction plane E. Concretely, in the exemplary embodiment according to FIG. 3, the group of first inflow elements 9a is arranged or formed on or in a functional component of the coating device 6 supported inside the process chamber 7 relative to the construction plane E, i.e., on or in a coater base body 6a carrying an, especially blade-like or blade-shaped, coating element 6b.

Figure 4:
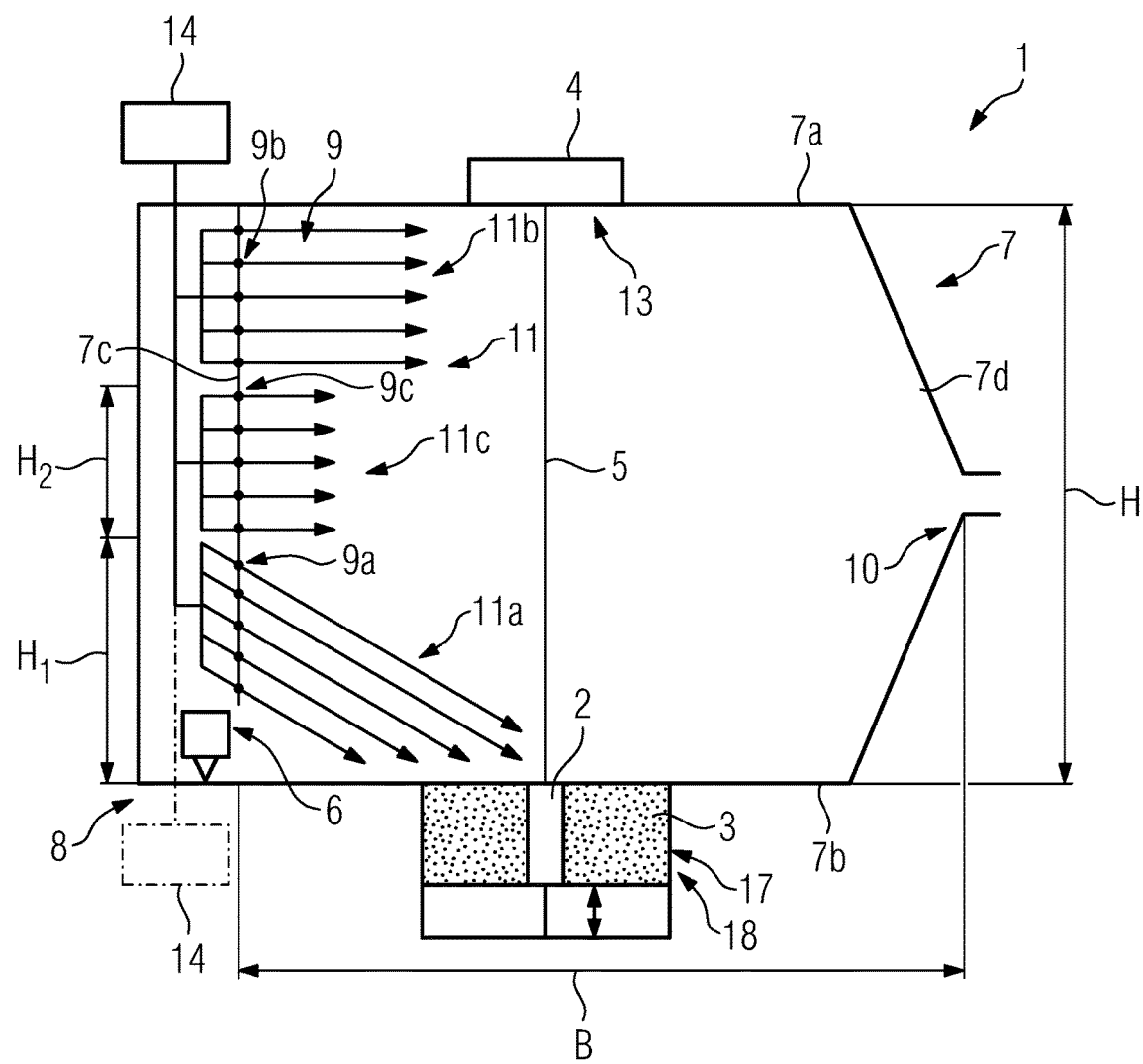

FIG. 4 shows a schematic diagram of an apparatus 1 according to another exemplary embodiment.

From FIG. 4 it can be seen that a lower process chamber limitation can also be a surface or upper side of a powder module assembly 18 comprising at least one powder module 17, especially a construction module, in the powder receiving room (construction room) of which the actual additive manufacturing of three-dimensional objects 2 takes place. The powder module assembly 18 is dockable via purely schematically represented (mechanic) docking interfaces on the powder module assembly to also purely schematically represented (mechanic) docking interfaces on the process chamber to the process chamber walls 7c, 7d limiting the process chamber 7 at the side. The (mechanic) docking interfaces on the process chamber form a docking area (not denoted in more detail) on the process chamber.

From FIG. 4 it can furthermore be seen that it is not mandatory for the inflow section 9 to extend across the entire process chamber height H, as it can also be achieved with a suitable alignment of the gas flow 11 or a partial gas flow 11a-11c that the gas flow 11 flows through the process chamber 7 across the entire process chamber height H. Apparently, the first few inflow elements 9a are arranged with a certain (vertical) distance above the lower process chamber limitation limiting the process chamber 7 at the bottom. Single, several, or all first few inflow elements 9a are aligned such that the first partial gas flow 11 first flows obliquely in the direction of the process chamber wall 7b and then along it (across the construction plane E). Due to the distance between the first few inflow elements 9a and the lower process chamber limitation, free space is formed in which the coating device 6 can be moved.

Finally, FIG. 4 shows that the outflow section 10 can be arranged or formed in the center of a tapered process chamber wall 7d limiting the process chamber 7 at the side. Due to the given geometry, especially the given conicity, of the process chamber wall 7a, respective partial gas flows 11a-11c can flow together out of the process chamber 7 in the range of the outflow section 10.

Of course, all features of the apparatus 1 shown with reference to the individual exemplary embodiments can be combined.

The invention claimed is:

1. An apparatus for additively manufacturing three-dimensional objects, the apparatus comprising:
    a process chamber having a defined process chamber height; and
    at least one flow device configured to generate and control a gas-flow that flows through the process chamber between an inflow section and an outflow section, wherein the gas-flow flows through the process chamber across substantially the entire process chamber height, wherein the gas-flow is subdivided into a plurality of partial gas-flows flowing through the process chamber parallel on top of each other, wherein the plurality of partial gas-flows comprises at least two partial gas-flows that differ from one another at the inflow section in respect of at least one flow characteristic of the respective one of the plurality of partial gas-flows;
    wherein the at least one flow device comprises:
        a first inflow element or a group of first inflow elements configured to generate a first partial gas-flow;
        at least one further inflow element or at least one group of further inflow elements respectively configured to generate at least one further partial gas-flow;
        a first flow guidance element assembly disposed upstream of the first inflow element; and
        at least one further flow guidance element assembly disposed upstream of a respective one of the at least one further inflow element.

2. The apparatus of claim 1, wherein the plurality of partial gas-flows comprises:
    the first partial gas-flow that flows through the process chamber in a first flow area between a lower process chamber limitation and a first height section of the process chamber along the lower process chamber limitation, and
    the at least one further partial gas-flow that flows through the process chamber in a further flow area between the first height section of the process chamber and an upper process chamber limitation along the upper process chamber limitation; and
    wherein the at least one further partial gas-flow comprises a least a portion thereof flowing directly above the first partial gas-flow, wherein the first partial gas-flow has a higher flow rate than the at least a portion of the at least one further partial gas-flow flowing directly above the first partial gas-flow.

3. The apparatus of claim 2, wherein the at least one further partial gas-flow comprises:

a second partial gas-flow that flows through the process chamber in a second flow area between the first height section of the process chamber and a second height section of the process chamber; and/or
    a third partial gas-flow that flows through the process chamber in a third flow area between the second height section of the process chamber and an upper process chamber limitation along the upper process chamber limitation.

4. The apparatus of claim 3, wherein the first partial gas-flow has a higher flow rate than that of at least the second partial gas-flow, wherein the second partial gas-flow flows directly above the first partial gas-flow; and/or
    wherein the third partial gas-flow has a higher flow rate than that of at least the second partial gas-flow, wherein the third partial gas-flow flows directly above the second partial gas-flow.

5. The apparatus of claim 4, wherein the first partial gas-flow has a higher flow rate than that of the third partial gas-flow.

6. The apparatus of claim 1, wherein the at least one flow device comprises:
    a first flow generation device configured to generate a first partial gas-flow; and
    at least one further flow generation device respectively configured to generate at least one further partial gas-flow.

7. The apparatus of claim 1, wherein the first inflow element or the group of first inflow elements is movably supported.

8. The apparatus of claim 7, wherein the first inflow element or the group of first inflow elements is arranged or formed on or in a functional component of a coating device configured to form construction material layers to be solidified selectively in a construction plane, the functional component of the coating device being movably supported inside the process chamber relative to the construction plane.

9. The apparatus of claim 8, wherein the functional component of the coating device comprises a coater base body, the coater base body configured to carry a coating element.

10. The apparatus of claim 8, wherein the outflow section is arranged or formed in a process chamber wall limiting the process chamber at a side of the process chamber.

11. The apparatus of claim 10, wherein the outflow section is arranged or formed in a center portion of the process chamber wall, and wherein the process chamber wall is tapered.

12. A method of additively manufacturing three-dimensional objects, the method comprising:
    generating a gas-flow with at least one flow device;
    flowing the gas-flow through a process chamber between an inflow section and an outflow section, the process chamber having a defined process chamber height, wherein the gas-flow flows through the process chamber across substantially the entire process chamber height,
    wherein the gas-flow is subdivided into a plurality of partial gas-flows flowing through the process chamber parallel on top of each other, wherein, as a result of the flow device, the plurality of partial gas-flows comprises at least two partial gas-flows that differ from one another at the inflow section in respect of at least one flow characteristic of the respective one of the plurality of partial gas-flows;

movably supporting a first inflow element or a group of first inflow elements provided for flowing gas into the process chamber by or for forming a first partial gas-flow; and movably supporting at least one further inflow element or at least one group of further inflow elements provided for flowing gas into the process chamber by or for forming the at least one further partial gas-flow.

13. The method of claim 12, wherein the plurality of partial gas-flows comprises:

the first partial gas-flow that flows through the process chamber in a first flow area between a lower process chamber limitation and a first height section of the process chamber along the lower process chamber limitation, and the at least one further partial gas-flow that flows through the process chamber in a further flow area between the first height section of the process chamber and an upper process chamber limitation along the upper process chamber limitation; and wherein the at least one further partial gas-flow comprises a least a portion thereof flowing directly above the first partial gas-flow, wherein the first partial gas-flow has a higher flow rate than the at least a portion of the at least one further partial gas-flow flowing directly above the first partial gas-flow.

14. The method of claim 13, wherein the at least one further partial gas-flow comprises:

a second partial gas-flow that flows through the process chamber in a second flow area between the first height section of the process chamber and a second height section of the process chamber; and/or a third partial gas-flow that flows through the process chamber in a third flow area between the second height section of the process chamber and an upper process chamber limitation along the upper process chamber limitation.

15. The method of claim 14, wherein the first partial gas-flow has a higher flow rate than that of at least the second partial gas-flow, wherein the second partial gas-flow flows directly above the first partial gas-flow; and/or wherein the third partial gas-flow has a higher flow rate than that of at least the second partial gas-flow, wherein the third partial gas-flow flows directly above the second partial gas-flow.

16. The method of claim 12, wherein the first inflow element or the group of first inflow elements is arranged or formed on or in a functional component of a coating device configured to form construction material layers to be solidified selectively in a construction plane, the functional component of the coating device being movably supported inside the process chamber relative to the construction plane.

17. The method of claim 16, wherein the functional component of the coating device comprises a coater base body, the coater base body configured to carry a coating element.

* * * * *